US012691314B2

(12) United States Patent
Alsaadi

(10) Patent No.: US 12,691,314 B2
(45) Date of Patent: Jul. 28, 2026

(54) RAPID FIREFIGHTING PIERCING NOZZLE

(71) Applicant: SAUDI ARABIAN OIL COMPANY, Dhahran (SA)

(72) Inventor: Abduraheem Alsaadi, Yanbu (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 269 days.

(21) Appl. No.: 18/423,079

(22) Filed: Jan. 25, 2024

(65) Prior Publication Data

US 2025/0242182 A1 Jul. 31, 2025

(51) Int. Cl.
*A62C 31/22* (2006.01)

(52) U.S. Cl.
CPC .................................... *A62C 31/22* (2013.01)

(58) Field of Classification Search
CPC ........... A62C 3/002; A62C 3/004; A62C 3/04; A62C 3/07; A62C 3/08; A62C 3/10; A62C 31/22; A62C 37/09; A62C 99/009
See application file for complete search history.

(56) References Cited

U.S. PATENT DOCUMENTS 1,756,582 A * 4/1930 Butler .................... A62C 31/22 175/232
2,738,815 A * 3/1956 Hoeldtke ................. B25G 1/04 30/308.1
5,368,106 A * 11/1994 Coughlin ............... A62B 3/005 169/70
6,971,451 B2 12/2005 Schmieg
7,017,832 B1 * 3/2006 Nelson ................... A62C 31/22 239/525
7,438,239 B2 10/2008 Woodson
10,610,715 B1 * 4/2020 Taylor .................... A62C 31/22
2003/0159837 A1 8/2003 Itschner
2015/0075820 A1 * 3/2015 Grant ..................... A62C 31/22 169/14

OTHER PUBLICATIONS

Task Force Tips (TFT), “Transformer Piercing Nozzle—PA1”; <https://tft.com/product/pa1>; Accessed Jan. 25, 2024 (2 pages).

(Continued)

*Primary Examiner* — Scott J Walthour
(74) *Attorney, Agent, or Firm* — Osha Bergman Watanabe & Burton LLP

(57) ABSTRACT

An apparatus for fighting fires in a target unit includes a dispending mechanism adapted to dispense a fire-extinguishing medium, a pointed nozzle tip including a chamber and defining an aperture in communication with the chamber, and an extender including a first end connected to the nozzle tip and a second end connected to an angle adapter. The inner and outer sleeves are hollow. The extender is in fluid communication with the nozzle tip and the angle adapter. The inner and outer sleeves are configured to slide relative to each other to adjust the length of the extender. The extender includes a locking mechanism to hold the sleeves in a set arrangement relative to each other. The angle adapter includes a striking surface opposite the extender. The shaft is hollow and in fluid communication with the angle adapter.

10 Claims, 4 Drawing Sheets

(56) References Cited

OTHER PUBLICATIONS

Testrite Aluminum, "Wholesale aluminum tubing & extrusions—Testrite Aluminum"; <https://www.testritealuminum.com/>; Accessed Jan. 25, 2024 (7 pages).
Testrite Instrument Co., Inc., "Telescopic Aluminum Tubing—Testrite Instrument Co., Inc."; <https://www.testriteoem.com/>; Accessed Jan. 25, 2024 (3 pages).

* cited by examiner

RAPID FIREFIGHTING PIERCING NOZZLE

BACKGROUND

In the process of fighting a fire within a target unit, it is often useful to pierce a barrier of the target unit to introduce fire-extinguishing medium, such as water or foam into the target unit. Many apparatuses exist for this purpose, but in order to adapt a given device for a specific thickness of barrier, it is often necessary to attach multiple separate pieces. Assembling a firefighting apparatus out of multiple pieces can waste valuable time in an emergency.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, the present invention relates to an apparatus for fighting fires in a target unit. The apparatus includes a dispending mechanism adapted to dispense a fire-extinguishing medium, a pointed nozzle tip comprising a chamber and defining an aperture in communication with the chamber, and an extender including a first end connected to the nozzle tip and a second end connected to an angle adapter. The fire-extinguishing medium is dispensed from the chamber to the target unit via the aperture. The extender includes an inner sleeve and an outer sleeve arranged concentrically. The inner and outer sleeves are hollow. The extender is in fluid communication with the nozzle tip and the angle adapter. The inner and outer sleeves are configured to slide relative to each other to adjust the length of the extender. The extender includes a locking mechanism to hold the inner and outer sleeves in a set arrangement relative to each other. The angle adapter includes a striking surface opposite the extender. The nozzle tip is introduced into the target unit by a force applied to the striking surface. The apparatus further includes a shaft connected to the angle adapter at a preset angle to the extender between 0 and 180 degrees. The shaft is hollow and in fluid communication with the angle adapter. The apparatus further includes a head connector connected to, and in fluid communication with, the shaft. The head connector is configured to connect to a dispensing mechanism adapted to dispense a fire-extinguishing medium. The apparatus includes, by the connection of the hollow components, a pathway through the apparatus for the fire-extinguishing medium to flow from the dispending mechanism through to and out the apertures of the nozzle tip.

In general, in one aspect, the present invention relates to a method for using a piercing apparatus to fight fire in a target unit. The method includes attaching a head connector of the piercing apparatus to a dispending mechanism adapted to dispense at least one fire-extinguishing medium, and extending an extender included in the piercing apparatus. The extender includes a first open end in fluid communication with a pointed nozzle tip and a second open end in fluid communication with the head connector. The extender includes an inner sleeve and outer sleeve arranged to slide relative to each other to adjust the length of the extender. The inner and outer sleeves of the extender are in fluid communication. The method also includes locking the extender in an extended position with a locking mechanism comprised in the extender, placing the pointed nozzle tip of the piercing apparatus against a part of the target unit to be pierced, introducing the nozzle tip into the target unit by a force applied to a striking surface of the piercing apparatus, and dispending fire-extinguishing medium into the target unit through the piercing apparatus. The pointed nozzle tip includes a chamber and defines an aperture in communication with the chamber. The chamber of the pointed nozzle tip is in fluid communication with the extender, head connector, and dispending mechanism. The at least one fire-extinguishing medium is able to be dispensed from the chamber to the target unit via the aperture. The striking surface is arranged inline with the nozzle tip.

Other aspects and advantages of the claimed subject matter will be apparent from the following description and the appended claims.

DETAILED DESCRIPTION

In one aspect, embodiments disclosed herein relate to an apparatus and method for penetrating a barrier of a target unit with a device configured to dispense a fire-extinguishing medium to fight a fire. The apparatus is arranged and optimized to reduce the number of separate parts that need to be assembled and overall reduce the amount of time to bring the apparatus into service in an emergency.

Figure 1:
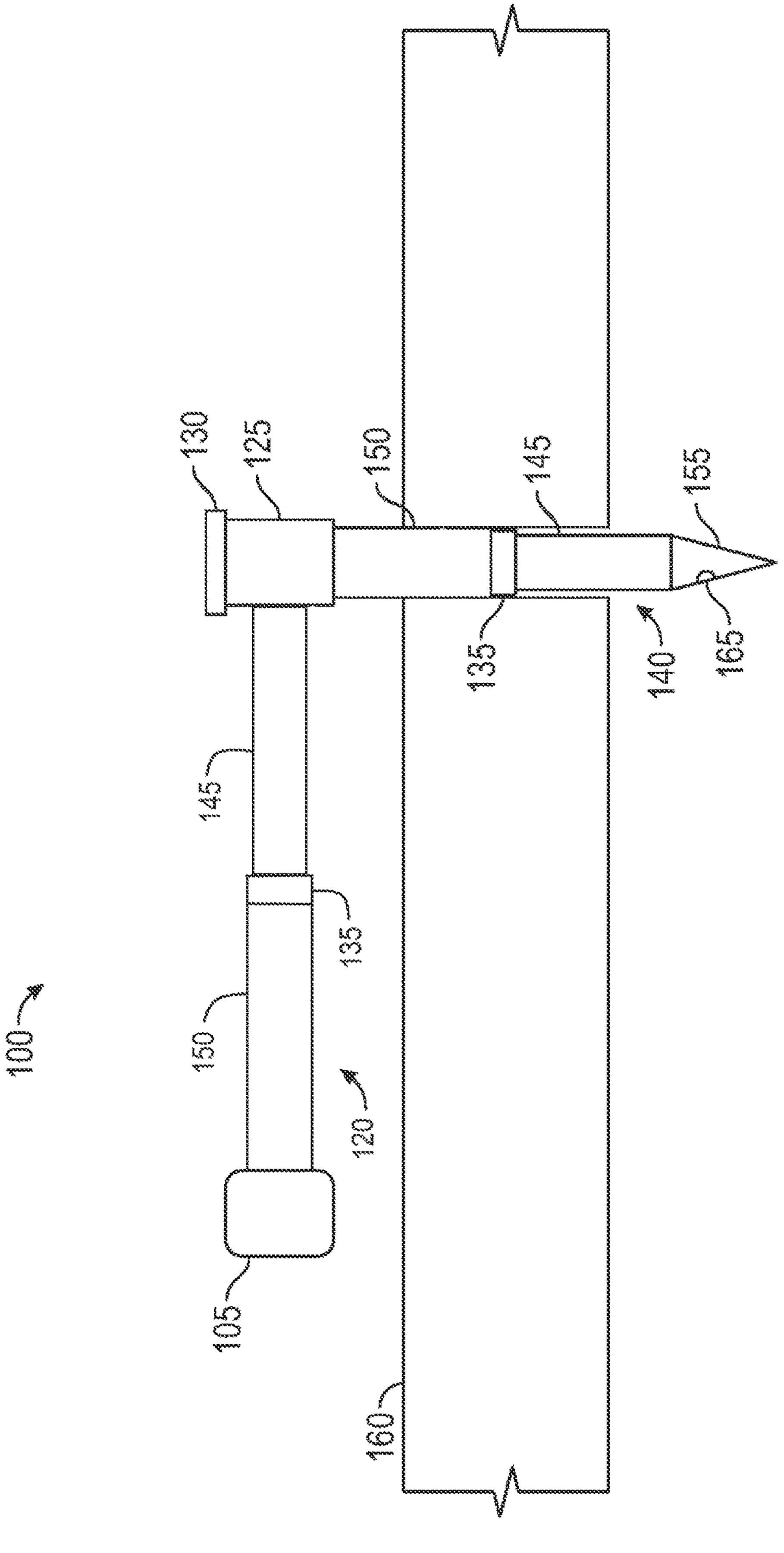
FIG. 1 shows a firefighting piercing nozzle in accordance with one or more embodiments.

FIG. 1 shows a firefighting piercing nozzle in accordance with one or more embodiments. The firefighting piercing apparatus 100 includes a head connector 105 connected to a shaft 120. The shaft 120 then connects to an angle adapter 125 which, on one end includes a striking surface 130 and on the other, connects to an extender section 140. The angle adapter 125 is arranged to hold the extender section 140 and the shaft 120 at a preset angle relative to each other of between 0 and 180 degrees. The extender section 140 includes a hollow inner sleeve 145 and an outer sleeve 150 nested concentrically together such that they can slide against each other to change the length of the extender section 140. The extender section 140 further includes a locking mechanism 135 to hold the inner and outer sleeves in a set arrangement relative to each other. In this embodiment, the shaft 120 is arranged similarly to the extender section 140, including a similar arrangement of inner and outer sleeves 145,150, as well as a locking mechanism 135. In alternate embodiments, the shaft 120 may instead be one continuous piece without a configuration that would allow extension.

At the opposite end of the extender section 140 from the adapter 125 is a pointed nozzle 155 configured to penetrate a barrier 160 and dispense a fire-extinguishing medium (not pictured) out from nozzle aperture 165. The nozzle includes a chamber and an aperture in communication with the chamber for flowing the fire-extinguishing medium. As a unit, the firefighting piercing apparatus 100 includes a pathway through from the head connector to the nozzle aperture 165 to convey a fire-extinguishing medium therethrough.

In an alternate embodiment, no adapter 125 or striking surface 130 is included and instead, the shaft and extension section are connected inline such that the shaft can be gripped to push the nozzle 155 through a barrier 160.

The locking mechanism 135 may be any suitably robust locking mechanism known in the art. For example, clutch locks, spring buttons, snap locks, split collar locks, or spring button A-clutch locks may be used. To be suitable for this application, a locking mechanism 135 must be substantially strong, leak resistant, and quick to both engage and disengage. Ideally, the locking mechanism 135 should also be operable while wearing heavy gloves such as firefighting gloves but this is not strictly necessary. Similarly, the fire-extinguishing medium may be any suitable medium known in the art. For example, water, fire-suppressing foam, and/or fire-suppressing powders may be used.

Figure 2:
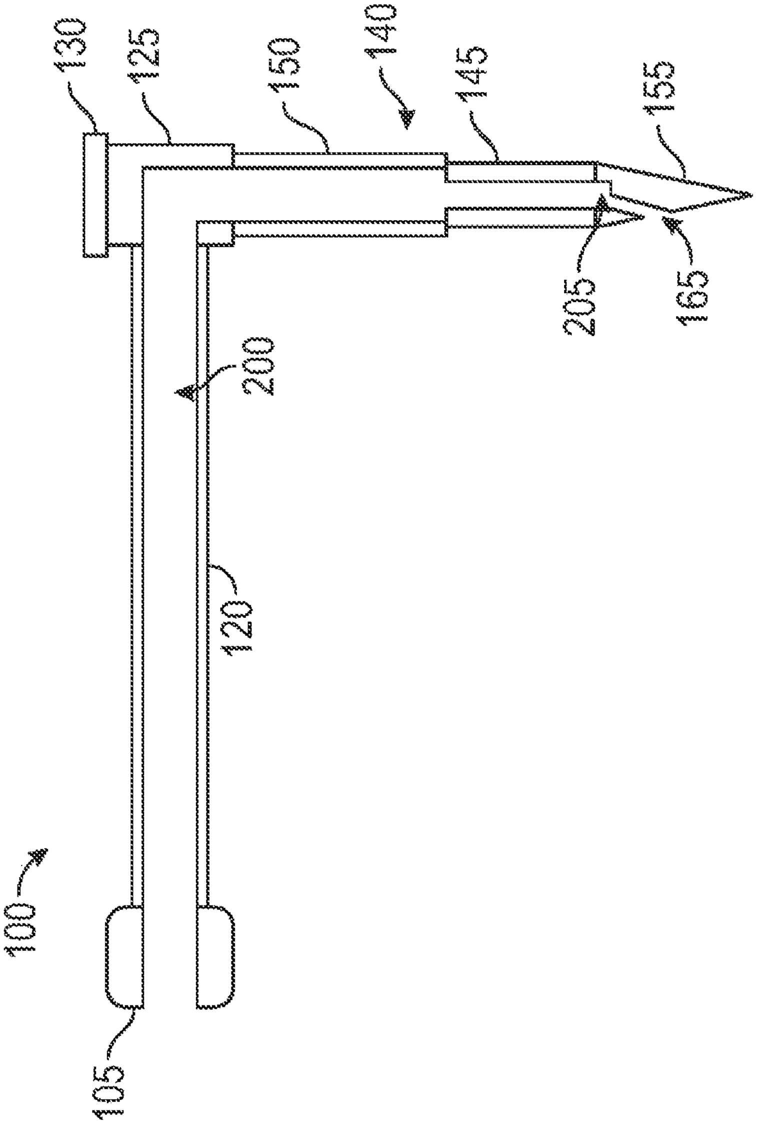
FIG. 2 shows a cutaway of a firefighting piercing nozzle in accordance with one or more embodiments.

FIG. 2 shows a cutaway of a firefighting piercing nozzle in accordance with one or more embodiments. In order to convey the fire-extinguishing medium through the piercing apparatus 100, a passage 200 through the apparatus is required. The chamber 205, nozzle aperture 165, nozzle 155, extender section 140, adapter 125, and head connector 105 are all in fluid communication with each other. Further, the head connector 105 is configured to connect to a source of fire-extinguishing medium such as a fire hose and pump.

Figure 3:
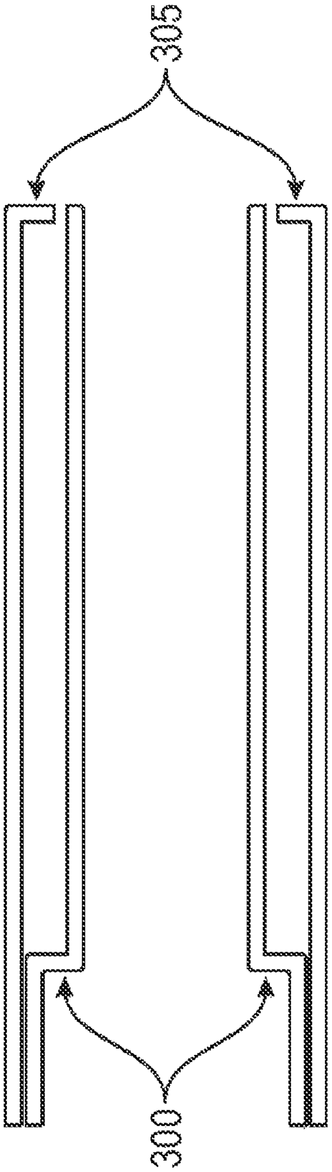
FIGS. 3 and 4 show a cutaway captive extender section in accordance with one or more embodiments.
Figure 4:
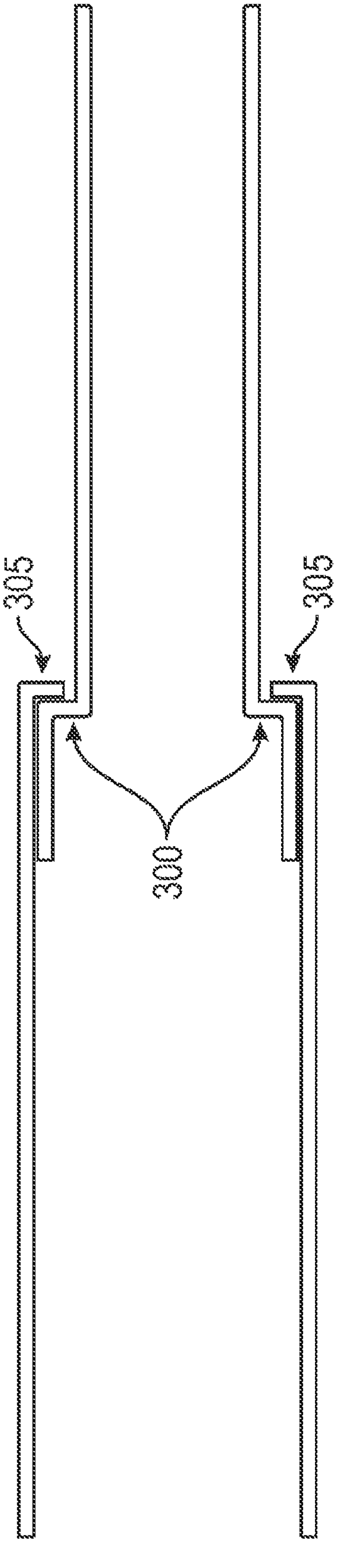

FIGS. 3 and 4 show a cutaway captive extender section in accordance with one or more embodiments. To keep the inner sleeve 145 from falling out of the outer sleeve 150 when the locking mechanism 135 is disengaged, the sleeves are arranged to hold the inner sleeve 145 captive inside the outer sleeve 150. This is accomplished by having lugs 300 arranged facing outward from the inner sleeve and catches 305 arranged facing inward from the outer sleeve. The lugs 300 and catches 305 are arranged such that, at the maximum extension of the extender section 140, interference is created between the lugs 300 and catches 305 to block the inner sleeve 145 from sliding out further. In alternate embodiments, the locking mechanism 135 is configured to hold the inner sleeve 145 captive when disengaged.

Figure 5:
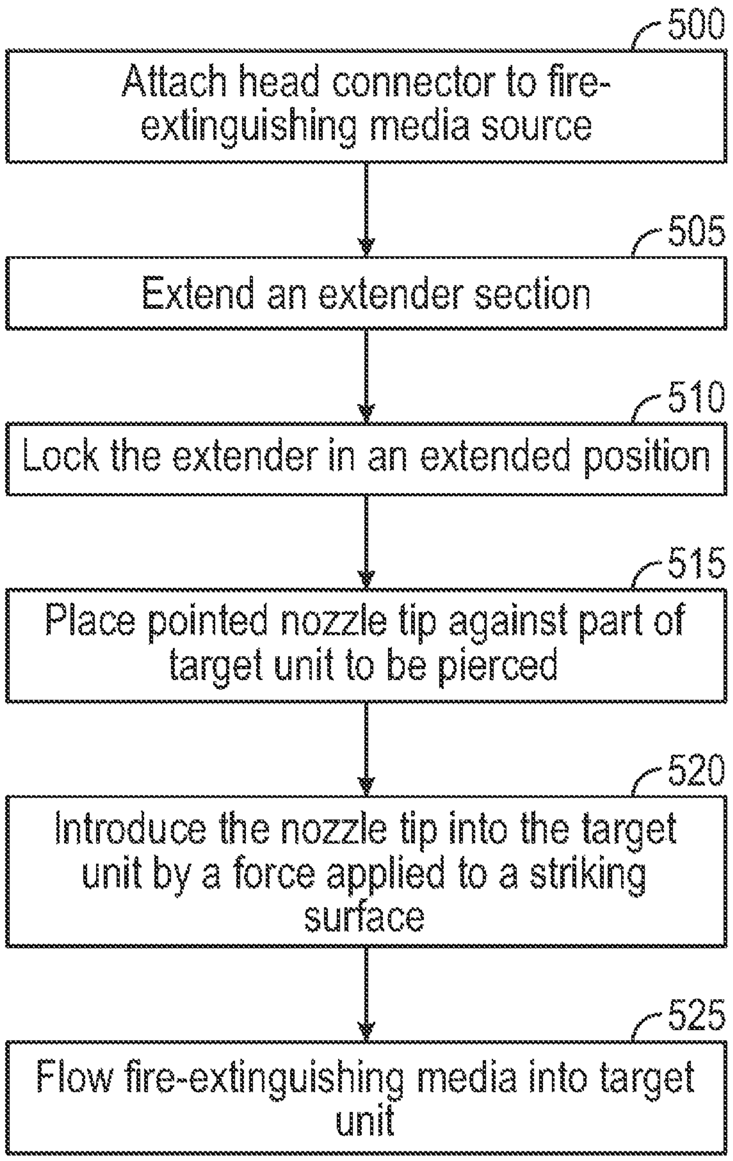
FIG. 5 shows a flowchart in accordance with one or more embodiments.

FIG. 5 shows a flowchart in accordance with one or more embodiments. The flowchart relates to a method for using the firefighting piercing apparatus 100 to fight a fire within a target unit. Step 500 is to attach the head connector to a source for fire-extinguishing medium. Step 505 is to extend the extender section 140 to the desired length. Step 510 is to lock the extender section 140 in the extended position using a locking mechanism comprised in the extender section 140. Step 515 is to place the pointed nozzle tip against the barrier to be pierced. Step 520 is to introduce the nozzle tip into the target unit through the barrier by applying a force to the striking surface. Step 525 is to flow fire-extinguishing medium through the apparatus and into the target unit.

Embodiments of the present disclosure may provide at least one of the following advantages. The ability to adjust the length of the extension section without having to disassemble or reassemble the apparatus increases reliability and response time for firefighting crews. Having all the components of the piercing apparatus able to be kept connected together similarly reduces the chance of losing an important component between incidents.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A method for using a piercing apparatus to fight fire in a target unit, the method comprising:

attaching a head connector of the piercing apparatus to a dispensing mechanism for dispensing a fire-extinguishing medium;

extending or retracting an extender comprised in the piercing apparatus, wherein the extender comprises a first open end in fluid communication with a pointed nozzle tip and a second open end in fluid communication with the head connector, wherein the extender comprises an inner sleeve and an outer sleeve arranged to slide relative to each other to adjust a length of the extender, wherein the inner and outer sleeves of the extender are in fluid communication;

locking the extender in an extended position or a retracted position with a locking mechanism comprised in the extender;

extending or retracting a shaft connected to the extender at a preset angle via an angle adaptor to a desired length by sliding an inner shaft sleeve outwardly or inwardly relative to an outer shaft sleeve;

locking the extended or retracted shaft in position with a lock;

placing the pointed nozzle tip of the piercing apparatus against a part of the target unit to be pierced, wherein the pointed nozzle tip comprises a chamber and defines an aperture in communication with the chamber, wherein the chamber of the pointed nozzle tip is in fluid communication with the extender, head connector and dispensing mechanism, wherein the fire-extinguishing medium is dispensed from the chamber to the target unit via the aperture;

introducing the pointed nozzle tip, whether the extender is extended or retracted, into the target unit by a force applied to a striking surface of the piercing apparatus, wherein the striking surface is arranged inline with the pointed nozzle tip; and dispensing the fire-extinguishing medium into the target unit through the piercing apparatus.

2. The method of claim 1, wherein the inner sleeve of the extender is held captive inside the outer sleeve by an outward facing lug on the inner sleeve that is blocked by an inward facing catch on the outer sleeve such that the inner sleeve cannot slide out of the outer sleeve when the locking mechanism is disengaged.

3. The method of claim 1, wherein the inner sleeve of the extender is held captive inside the outer sleeve by the locking mechanism.

4. The method of claim 1, wherein the locking mechanism is at least one of a clutch lock, a spring button, a snap lock, a split collar lock, or a spring button A-clutch lock.

5. The method of claim 1, wherein the fire-extinguishing medium comprises at least one of water, fire-suppressing foam, or fire-suppressing powder.

6. An apparatus for fighting fires in a target unit, the apparatus comprising:

a dispensing mechanism for dispensing a fire-extinguishing medium;

a pointed nozzle tip comprising a chamber and defining an aperture in communication with the chamber and the dispensing mechanism;

an extender comprising a first end connected to the pointed nozzle tip and a second end connected to an angle adapter, wherein the extender comprises an inner sleeve and an outer sleeve arranged concentrically and configured to slide relative to each other to adjust a length of the extender from a retracted position to an extended position, wherein the inner and outer sleeves of the extender are hollow, wherein the extender is in fluid communication with the pointed nozzle tip and the angle adapter, and wherein the extender comprises a locking mechanism to hold the inner and outer sleeves in a set arrangement relative to each other, wherein the angle adapter comprises a striking surface opposite the extender, whereby the pointed nozzle tip, whether the extender is in the retracted position or the extended position, is introduced into the target unit by a force being applied to the striking surface; and a shaft connected to the angle adapter at a preset angle to the extender of between 0 and 180 degrees, wherein the shaft is hollow and in fluid communication with the angle adapter, and a head connector connected to, and in fluid communication with, the shaft and the dispensing mechanism, wherein the apparatus comprises a pathway through the head connector, the shaft, the angle connector, the extender, and the pointed nozzle tip for the fire-extinguishing medium to flow from the dispensing mechanism through, to, and out the aperture of the pointed nozzle tip;

wherein the shaft comprises a hollow inner shaft sleeve and a hollow outer shaft sleeve arranged concentrically and configured to slide relative to each other to adjust a length of the shaft, and wherein the shaft comprises a locking mechanism to hold the hollow inner shaft sleeve and the hollow outer shaft sleeve in a set arrangement relative to each other.

7. The apparatus of claim 6, wherein the inner sleeve of the extender is held captive inside the outer sleeve by an outward facing lug on the inner sleeve that is blocked by an inward facing catch on the outer sleeve such that the inner sleeve cannot slide out of the outer sleeve when the locking mechanism is disengaged.

8. The apparatus of claim 6, wherein the inner sleeve of the extender is held captive inside the outer sleeve by the locking mechanism.

9. The apparatus of claim 6, wherein the locking mechanism is at least one of a clutch lock, a spring button, a snap lock, a split collar lock, or a spring button A-clutch lock.

10. The apparatus of claim 6, wherein the fire-extinguishing medium comprises at least one of water, fire-suppressing foam, or fire-suppressing powder.

* * * * *